V. A. TOMSKY.
SANITARY SUGAR BOWL.
APPLICATION FILED APR. 10, 1914.

1,157,910.

Patented Oct. 26, 1915.

Witnesses
R. F. Maryman
L. N. Gillis

Inventor
Victor A. Tomsky
By
Attorneys

UNITED STATES PATENT OFFICE.

VICTOR A. TOMSKY, OF NEW YORK, N. Y.

SANITARY SUGAR-BOWL.

1,157,910.  Specification of Letters Patent.  Patented Oct. 26, 1915.

Application filed April 10, 1914. Serial No. 831,075.

*To all whom it may concern:*

Be it known that I, VICTOR A. TOMSKY, a citizen of the United States, residing at New York, in the county of New York, State of New York, have invented certain new and useful Improvements in Sanitary Sugar-Bowls; and I do hereby declare the following to be a full, clear, and exact description of the invention, such as will enable others skilled in the art to which it appertains to make and use the same.

This invention relates to measuring devices and has special reference to a sanitary sugar bowl arranged to deliver uniform quantities of sugar without making it necessary to dip a spoon in the sugar or to in any way expose the same to the air.

The principal object of the invention is to provide an improved and simplified sanitary sugar bowl wherein the sugar will be held in storage free from all contamination and from which the sugar may be delivered at will in measured quantities such as by the teaspoonful or like measure.

Another object of the invention is to provide a device of this description which may be used for delivering any granulated substance in measured quantities.

With the above and other objects in view the invention consists in general of certain novel details of construction and combination of parts hereinafter fully described, illustrated in the accompanying drawings and specifically claimed.

In the accompanying drawings, like characters of reference indicate like parts in the several views, and:—

Figure 1:
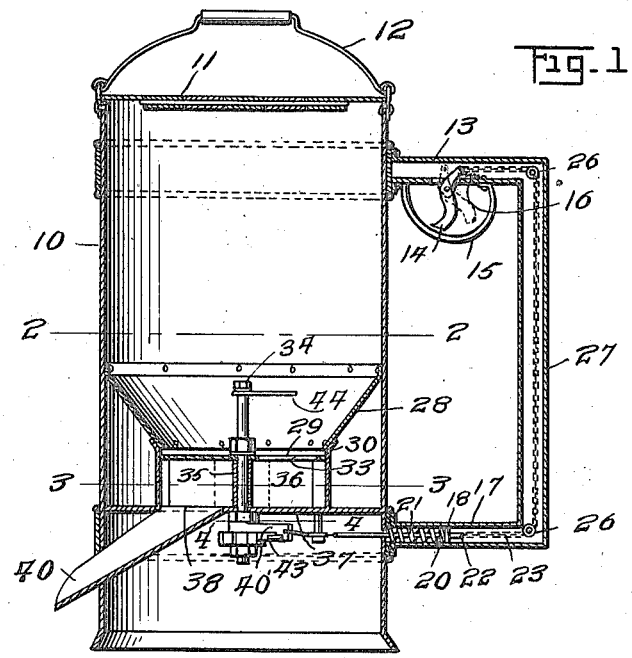
Figure 2:
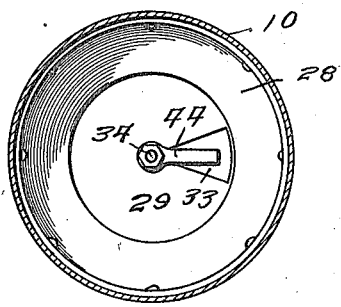
Figure 3:
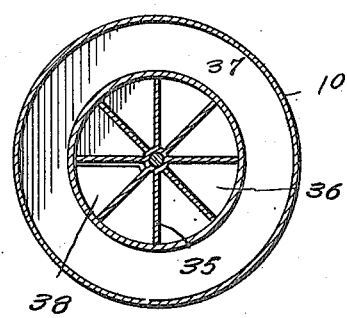
Figure 4:
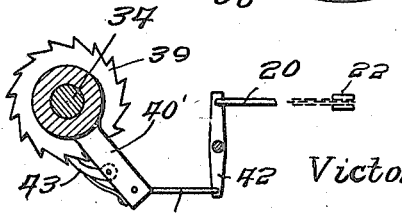

Figure 1 is a vertical median section through a device constructed in accordance with this invention. Fig. 2 is a section on the line 2—2 of Fig. 1. Fig. 3 is a section on the line 3—3 of Fig. 1. Fig. 4 is a section on the line 4—4 of Fig. 1.

In carrying out the objects of this invention there is provided a suitable casing 10 which is preferably of cylindrical form and may be either plain or ornamental as desired. This casing is provided with a hinged top 11 so that sugar may be inserted in the casing through this top and the casing is also provided with a carrying handle or bale 12.

Extending from one side of the upper part of the casing is a tubular bracket 13 and this bracket is slotted at its under side so that a trigger 14 may be pivoted to the bracket and have its end extend up into the bracket. This trigger is preferably surrounded by a suitable guard 15 and is normally held in the full line position shown in dotted lines in Fig. 1 by means of a suitable spring 16.

Adjacent the lower end of the cylinder 10 is a similar tubular bracket 17 which communicates with the cylinder and across this bracket 17 extends a diaphragm 18. Slidably mounted in the bracket 17 and extending through the diaphragm is a pull rod 20 which is normally urged in the direction of the casing or cylinder by means of a suitable spring 21. This pull rod 20 has on its outer end an eye 22 to which is connected a flexible strand 23 preferably in the form of a light chain. This strand runs over guide pulleys 26 which are carried at the outer ends of the tubular brackets 13 and 17 and it is to be noted that these outer ends are connected by a tubular handle 27 through which the chain passes. The chain has its remaining end connected to the trigger 14 so that by grasping the handle 27 and pulling on the trigger with the fore finger the rod 20 is moved in one direction, while by releasing the trigger, the rod 20 will be moved in the opposite direction by the action of the spring 21.

Mounted within the casing 10 is a false bottom 28 which is preferably of inverted frusto-conical form and secured to this false bottom is a plate 29 forming the top of the delivery chamber.

The plate 29 is provided with a feed opening 33 and through this plate 29 extends an operating shaft 34 which is freely revoluble in the plate but which has fixed thereon beneath the plate a delivery wheel 35 having a series of compartments 36 formed thereon, said compartments each being of such size as to deliver the desired quantity of sugar.

Beneath the delivery wheel is a secondary false bottom 37 which is provided with a delivery opening 38 communicating with a downwardly inclined delivery chute 40 which passes out of the side of the casing and terminates above the bottom of said casing.

On the shaft 34 is fixed a ratchet wheel 39 while freely revoluble on said shaft is an arm 40'. To this arm 40' is connected a link 41 which serves to connect the arm with a lever 42 pivoted intermediate its end within the casing and having its remaining end connected to the rod 20. Furthermore there is pivoted to the arm 40' a spring pressed pawl 43 which engages the ratchet 39. On the upper end of the shaft 34 is mounted a stirring arm 44 which may be of any desired shape and serves to agitate the sugar in the receptacle.

It is of course to be understood that suitable lock and antifriction washers are to be employed to hold the parts together, these being the well known means and not deemed necessary here to be described.

In operation, the receptacle having been filled, the sugar will pass through the opening 33 and fill one of the receptacles 36 in the feed wheel. Now by operating the trigger 14 the filled receptacle will be rotated through the action of the rod 20 and pawl 43 with their connected parts on the ratchet 39. This will bring the full compartment around to registry with the opening 33 whereupon the sugar will pass down the chute into the cup or other receptacle which may be held therefor. Successive operations of the trigger 14 will deliver successive quantities of sugar in the same manner, the quantity delivered by any one operation being regulated by the size of the compartment in the feed wheel.

There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention, what is claimed as new, is:—

In a dispensing apparatus of the class described, a main casing, a tubular handle having the free ends of its arms secured to the casing, a dispensing mechanism in the lower portion of the casing, and means for actuating said mechanism in successive steps comprising a trigger intermediately pivoted to the upper arm of the handle and extending therein, a rod slidable in the lower arm of the handle, and operatively connected to the actuating mechanism, and a flexible member disposed in said tubular handle connecting the trigger and the rod.

In testimony whereof, I affix my signature, in the presence of two witnesses.

VICTOR A. TOMSKY.

Witnesses:
 FREDK. A. YAGER,
 EDWARD CLARK.